United States Patent [19]

Sham et al.

[11] Patent Number: 5,270,401
[45] Date of Patent: Dec. 14, 1993

[54] PLASTICS COMPOSITION BASED ON A THERMOPLASTIC BLEND OF A POLYAMIDE AND A POLYESTER

[75] Inventors: Chi K. Sham, Arnhem; Wilhelmus T. M. Jansen, Duiven; Martin A. Doherty, Arnhem, all of Netherlands

[73] Assignee: DSM N.V., Netherlands

[21] Appl. No.: 776,529

[22] Filed: Oct. 11, 1991

[30] Foreign Application Priority Data

Oct. 17, 1990 [NL] Netherlands ................ 9002253

[51] Int. Cl.⁵ .................... C08F 203/01; C08L 77/00
[52] U.S. Cl. ........................... 525/420; 525/166;
525/167; 525/167.5; 525/174; 525/178;
525/183; 525/190; 525/296; 525/301.5;
525/302; 525/420.5; 525/421; 525/422;
525/426; 525/432
[58] Field of Search ............. 525/80, 166, 167, 167.5,
525/174, 178, 183, 190, 296, 301.5, 302, 420,
432, 420.5, 421, 422, 426

[56] References Cited

U.S. PATENT DOCUMENTS 3,626,026 12/1971 Fukumura et al. .................. 525/176
4,820,771 4/1989 Müssig et al. ...................... 525/183
4,977,213 12/1990 Giroud-Abel et al. .......... 525/420.5

FOREIGN PATENT DOCUMENTS 60-137961 7/1985 Japan .

Primary Examiner—John Kight, III
Assistant Examiner—John M. Cooney, Jr.
Attorney, Agent, or Firm—Cushman, Darby & Cushman

[57] ABSTRACT

Disclosed is a plastics composition comprising a thermoplastic blend comprising: (1) 5-95 wt % of a polyamide (PA) and 95-5 wt % of a polyester (PE) incorporating 1-50 wt % of an aliphatic dimer fatty acid, (2) 0.01-30 parts by weight of a compound having at least one ethylenically unsaturated group or propylene group and further having a carboxylic, acid anhydride, acid amide, imido, carboxylic ester, amino or hydroxyl group per 100 parts by weight based on the combined weight of PA and PE, (3) 0-90 parts by weight of a polyester not modified with dimer fatty acid per 100 parts by weight based on the combined weight of PA and PE. Preferably the polyester (PE) is a polyethylene terephthalate or polybutylene terephthalate modified with di-oleic acid. The blends have a greatly improved elongation at break and are readily spinnable.

11 Claims, No Drawings

PLASTICS COMPOSITION BASED ON A THERMOPLASTIC BLEND OF A POLYAMIDE AND A POLYESTER

BACKGROUND OF THE INVENTION

The invention relates to a plastics composition based on a polyamide and a polyester, and to a process for preparing such a composition.

Plastics compositions based on a polyamide and a polyester were earlier proposed in Japanese Patent Application J6-0137-961. According to this patent publication a blend having improved heat and moisture resistance and a higher impact strength can be obtained by melt blending 60-95 parts by weight of a polyamide, 100 parts of an aromatic polymer such as polyethylene terephthalate, 0.05-5 parts of an unsaturated compound such as maleic anhydride, and 0.01-5 parts of a peroxide. However, we have found that several physical properties of these blends are not quite satisfactory. This manifests itself not only in a greatly reduced elongation at break but also in such blends not being spinnable.

SUMMARY OF THE INVENTION

The invention now provides a plastics blend of a polyamide and a polyester which has a greatly improved elongation at break and is readily spinnable. The invention is a plastics composition of the known type mentioned in the opening paragraph comprising a thermoplastic blend comprising: (1) 5-95 wt % of a polyamide (PA) and 95-5 wt % of a polyester (PE) incorporating 1-50 wt % of an aliphatic dimer fatty acid, (2) 0.01-30 parts by weight of a compound having at least one ethylenically unsaturated group or propylene group and further having a carboxylic, acid anhydride, acid amide, imido, carboxylic ester, amino or hydroxyl group per 100 parts by weight based on the combined weight of PA and PE, and (3) 0-90 parts by weight of a polyester not modified with dimer fatty acid per 100 parts by weight based on the combined weight of PA and PE.

DETAILED DESCRIPTION OF THE INVENTION

According to the invention preference is given to plastics compositions in which the amounts by weight of PA and PE are in a ratio to each other of 1/9 to 9/1. Especially when ingredient (3) is absent, preference is given to plastics compositions in which the amounts by weight of PA and PE are in a ratio to each other of 3/7 to 7/3.

The composition of the polyester (PE) incorporating 1-50 wt % of a dimer fatty acid may vary widely. The sole requirement is that it can be melt blended with the polyamide to be admixed without any apparent problems. Hence the polyester's structure may be either amorphous or crystalline Using a polyester with an amorphous structure in an amount of 10 wt % or more will result in the blend's modulus being decreased significantly, and the composition will also display a more elastomeric character.

In general it is preferred that a polyester having a more crystalline structure be used, more particularly when, in addition, a polyester not modified with dimer fatty acid (3) is incorporated into the blend and this polyester to be admixed also has a crystalline structure. Of course, both the polyester incorporating an aliphatic dimer fatty acid and the one not modified with dimer fatty acid may incorporate still further difunctional compounds such as di-acids or glycols. They may be either simple, relatively low-molecular weight compounds or composite compounds. As examples of the latter may be mentioned polybutylene adipate and the polyalkylene glycols having a molecular weight of 600-6000, more particularly of 1000-4000. Utilization of said comparatively higher-molecular weight compounds will produce polymers of an elastomeric character.

According to the invention a composition is preferred in which the polyester (PE) is derived from an aromatic dicarboxylic acid, a dimer fatty acid, and a low-molecular weight diol having a molecular weight of not higher than 250. Examples of relatively high-melting crystalline polyesters than can be used according to the invention include polyethylene terephthalate, polybutylene terephthalate, polyneopentyl terephthalate, polyneopentyl-2,2-dimethyl malonate, polyethylene-2,6-naphthalate, poly-1,4-cyclohexylene dimethylene terephthalate, polybutylene naphthalate, as well as copolyesters of ethylene terephthalate containing at least 80 mole % of ethylene terephthalate; for instance, the 95/5, 90/10, 85/15, and 80/20 ethylene terephthalate-ethylene isophthalate copolyesters, ethylene terephthalate-ethylene adipate copolyesters, ethylene terephthalate-ethylene hexahydroterephthalate copolyesters, and tetramethylene terephthalate-tetramethylene azelate copolyesters.

Polyesters having a more amorphous structure can be obtained in a manner analogous to that described for the highmelting, crystalline polyesters by, e.g., polycondensation of polyfunctional, preferably difunctional alcohols, aminoalcohols, hydroxycarboxylic acids, lactones, aminocarboxylic acids, cyclic carbonates or polycarboxylic acids. By properly selecting the mixing ratio of the aforementioned ingredients it is possible to obtain any molecular weight desired, as well as any number and type of end groups desired.

As examples may be mentioned polyesters composed of adipic acid and ethylene glycol, butane diol, pentane diol, hexane diol, blends of ethylene glycol and propylene glycol, hexane diol and methylhexane diol, hexane diol and 2,2-dimethylpropane diol, hexane diol, butane diol or pentane diol, or polyester amides composed of hexane diol and piperazine. Alternatively, other glycols such as 1,3- Or 1,4-cyclohexane diol or 1,3- or 1,4-bishydroxymethylcyclohexane, amino-alcohols such as amino-ethanol or aminopropanol may be incorporated into these low-melting polyesters Also, the low-melting polyesters may be made up wholly or in part of lactones such as substituted or unsubstituted caprolactone or butyrolactone. The dimer fatty acids to be employed according to the invention comprise both the hydrogenated dimer fatty acids and the polyester-forming functional derivatives thereof. Preference is given in this case to a composition in which the aliphatic dimer fatty acid has 30-46 carbon atoms. Examples of dimer fatty acids that may be used according to the invention include di-elaidic acid, dilinolenic acid, dilinoleic acid, di-oleic acid, and hydrogenated dilinolenic acid. When a polyester not modified with dimer fatty acid is employed, use may be made of a polyarylate or a polycarbonate. Preference is given to polyethylene terephthalate or polybutylene terephthalate.

Compound (2), which contains an ethylenically unsaturated group and/or a propylene group, preferably is maleic anhydride, maleic acid, fumaric acid, maleic imide, maleic hydrazide, methyl nadic anhydride, dichloromaleic anhydride, maleic acid diamide, a natural fat or oil, an unsaturated carboxylic ester, an acid amide or anhydride of an unsaturated carboxylic acid, an unsaturated alcohol, an unsaturated amine, a reaction product of a diamine and maleic anhydride, maleic acid, fumaric acid, maleic imide or maleic hydrazide, an adduct of a diene polymer or an ethylene-propylene copolymer to maleic anhydride or a diene polymer or ethylene-propylene copolymer substituted with an amino, carboxyl, acid anhydride or hydroxyl group.

Preparation of the (co)polyesters to be used according to the present invention preferably is as follows. First the polyester-forming functional derivatives are heated with an excess of alkylene glycol in the presence of a suitable catalyst to a temperature of about 120°-220° C. at a pressure of from 150 mm Hg to atmospheric until there is no further release of low-molecular weight condensation product. Next, the temperature is increased further to a value in the range of 235° to about 255° C., with simultaneous reduction of the pressure to 1 mm Hg or less. After this heating is continued until the polymer has an intrinsic viscosity (I.V.) of about 0.5-1.5 dl/g (determined in orthochlorophenol at 25° C.). An alternative embodiment consists in that when a dimer fatty acid is employed, it is not added until shortly before the high vacuum is applied. The preparation periods for the two processes are about 90-150 minutes for the conversion at atmospheric pressure and about 120-180 minutes for the polycondensation reaction.

The polyamides that can be employed according to the invention are homo- as well as copolymers. Generally, they are obtained by polycondensation of difunctional monomers, for instance by the condensation of diamines and dicarboxylic acids and by polymerization of lactams such as ε-caprolactam. Examples of suitable dioic acids include: carboxylic acid, oxalic acid, glutaric acid, adipic acid, pimelic acid, suberic acid, azelaic acid, sebacic acid, dodecanedicarboxylic acid, and the like. Examples of suitable diamines include: hydrazine, ethylene diamine, 1,4-butane diamine, hexamethylene diamine, 1,8-octane diamine, piperazine, and the like. Alternatively, aminocarboxylic acids may be used to prepare polyamides that can be employed according to the invention. As well as aliphatic polyamides there may be employed according to the invention aromatic polyamides in the preparation of which use is made of aromatic diamines and dioic acids. As suitable aromatic dioic acids may be mentioned: terephthalic acid, isophthalic acid, phthalic acid, and the like. Suitable aromatic diamines include o-phenylene diamine, 2,4-diaminotoluene, and 4,4'-methylene dianiline. The polyamides can be prepared in a known manner, e.g. by direct amidation, low temperature polycondensation of diamines and dioic acid chlorides, ring-opening polymerization of lactams, addition of amines to activated double bonds, polymerization of isocyanates, and reaction of formaldehyde with dinitriles. Examples of suitable polyamides are, inter alia polyhexamethylene adipamide (polyamide-6,6), poly(ε-caprolactam) (polyamide-6), polypropiolactam (polyamide-3), polypyrrolidone (polyamide-4), poly(ω-enanthamide) (polyamidepolycapryllactam (polyamide-8), poly(ω-undecaneamide) (polyamide-11), polylaurolactam (polyamide-12), polyhexamethylene terephthalamide (polyamide-6,T), polytetramethylene adipamide (polyamide-4,6), and copolymers.

In addition, reinforcing fibers and fillers may be incorporated into the plastics compositions according to the invention. Examples of reinforcing fibers include those of glass, carbon, aromatic polyamide, and thermotropic liquid crystalline polymers having a sufficiently high melting point. Examples of fillers include talcum, calcium carbonate, wollastonite, and silicates. Other synthetic materials such as polycarbonates, phenoxy resin (like UCAR from Union Carbide Corporation), polyester carbonates, polyphenylene oxide, polyphenylene sulfide, and polyarylates also may be blended into the plastics compositions according to the invention. Further, polyfluorocarbon compounds such as PTFE may be incorporated into the present plastics compositions, as well as pigments, stabilizers, and plasticizers. The present plastics compositions are prepared in a manner analogous to that disclosed in Japanese Patent Application J6-0137-961 mentioned hereinbefore, without there being special limits on either time or temperature. Proper conditions are dependent on the composition of the material. The mixing temperature is usually in the range of from 150° to 350° C. As a rule, the shortest possible residence time will be aimed at, in order to inhibit decomposition. Mixing may be carried out either continuously or discontinuously in an extruder, a Banbury mixer, rollers, and kneaders. Preference is given in this case to a two-step process, the first step of which comprises polyester (PE) modified with aliphatic dimer fatty acid being extruded with ingredient (2) and preferably in the presence of a radical initiator, after which, in a second step, the extruded product is extruded with the PA and any present ingredient (3), fibers, fillers, and other additives. It is preferred here to carry out the entire mixing process in a single extruding run, for instance by feeding polyester modified with dimer fatty acid (I) and ingredient (2) to the extruder throat together with radical initiator, and then feeding the remainder of the ingredients to be incorporated into the blend further downstream in the same extruder.

Preferably, use is made of such radical initiators as display optimum action at the prevailing operating temperature, which, in its turn, is dependent on the melting points of the ingredients to be mixed. Although in general organic peroxides are preferred, a comparable result can also be attained using C—C, N—O or other initiators which are radical-releasing at that temperature.

As suitable radical initiators may be mentioned: diisopropylbenzene peroxide, 1,3-bis(tert-butylperoxyisopropyl)benzene, 2,3-dimethyl-2,3-diphenyl butane, and ethyl-0-benzoyl laurohydroxymate. The amount of radical initiator that has to be fed ranges from 5-30 wt %, calculated on the amount of ingredient (2) fed.

The invention will be illustrated with reference to the following examples. Of course these are not to be construed as limiting in any manner to the scope thereof. Unless otherwise specified, the amounts in the examples below always are amounts by weight. The ingredients employed in the examples had the following properties:
a) polyamide-6,6 (ex Akzo Plastics) having $\eta_{rel}=2.35$ (1 g per 100 ml of 90% formic acid) at 25° C. and $T_{mp}$ (melting point) = 256° C. (in accordance with ASTM D-2117)

b) polyamide-6 (ex Akzo Plastics) having $\eta_{rel}$=2.4 (1 g per 100 ml of 90% formic acid) at 25° C. and $T_{mp}$, =218° C. (in accordance with ASTM D-2117).

c) polyethylene terephthalate (ex Akzo Plastics) having $\eta_{rel}$=2.13 (1 g per 100 g of m-cresol) at 25° C. and $T_{mp}$=255° C. (in accordance with ASTM D-2117).

d) polyethylene terephthalate (ex Akzo Plastics) having $\eta_{rel}$=2.04 (1 g per 100 g of m-cresol) at 25° C. and $T_{mp}$=255° C. (in accordance with ASTM D-2117). polyethylene terephthalate (ex Akzo Plastics) having $\eta_{rel}$ =2.1 (1 g per 100 g of m-cresol) at 25° C. and $T_{mp}$=255° C. (in accordance with ASTM D-2117).

f) polybutylene terephthalate modified with 10 wt % of dioleic acid (ex Akzo Plastics) having $\eta_{rel}$=2.06 (1 g per 100 g of m-cresol) at 25° C. and $T_{mp}$=217° C. (in accordance with ASTM D-2117).

g) As ingredient (2) was used Nourymix MA 903 (ex Akzo Chemicals), which is composed of a concentrate of 50 wt % of maleic anhydride (MAA) on a carrier of HDPE.

h) P/BC (Perkadox ® BC ex Akzo Chemicals)=diisopropylbenzene peroxide.

i) P/14 (Perkadox ® 14 ex Akzo Chemicals)=1,3-bis(-tertbutylperoxyisopropyl)benzene.

j) P/30 (Perkadox ® 30 ex Akzo Chemicals)=2,3-dimethyl-2,3diphenyl butane.

k) Tx101 (Trigonox ® 101 ex Akzo Chemicals)=2,5-dimethyl-2,5-bis(tert-butylperoxy)hexane.

l) Tx107 (Trigonox ® 107 ex Akzo Chemicals)=ethyl-0-benzoyl laurohydroximate.

m) polyamide-6,6 (ex Akzo Plastics) having $\eta_{rel}$=2.12 (1 g per 100 ml of 90% formic acid) at 25° C.

n) polyamide-6 (ex Akzo Plastics) having $\eta_{rel}$=3.0 (1 g per 100 ml of 90% formic acid) at 25° C.

o) polyarylate (Ardel D-100 ex Amoco) having $\eta_{rel}$=1.78 (1 g per 100 g of m-cresol) at 25° C.

p) polycarbonate (Makrolon 2400 ex Bayer AG).

q) Keltaflex N35 (ex DSM), a blend of EPDM-rubber and an ethylenepropylene copolymer with maleic anhydride grafted thereon.

r) Mod-U74D (ex Akzo Plastics), (f) with 2% of maleic anhydride grafted thereon in the presence of 0.2 wt % of P/BC (h).

s) Arnitel A 52D (ex Akzo Plastics), a copolyether polyamide based on adipic acid, polyoxypropylene glycol, and polyamide-6.

t) MA 911, ingredient (2), (ex Akzo Chemicals) composed of a concentrate of 75 wt % of maleic anhydride (MAA) in polypropylene.

u) Perkadox ® 64 (ex Akzo Chemicals)=1,4-bis(tert-butylperoxyisopropyl)benzene on a polypropylene carrier.

polyethylene terephthalate (ex Akzo Plastics) having $\eta_{rel}$=2.06 (1 g per 100 g of m-cresol) at 25° C. and $T_{mp}$=255° C. (in accordance with ASTM D-2117).

w) polyamide-4,6 (ex DSM) having $\eta_{rel}$3.21 (1 g per 100 g of m-cresol) at 25° C. and $T_{mp}$=295° C. (in accordance with ASTM D-2117).

x) silenka 8045 (ex Silenka) is a glass fiber supplied by Silenka.

In the preparation of the plastics compositions according to the invention the polyester (PE) modified with dimer acid was first functionalized with ingredient (2) to form a prepolymer. The preparation of these prepolymers is disclosed in Example 1.

EXAMPLE I

Preparation of polyester (PE) modified with dimer acid (f)

Into a 1000-1 autoclave were charged 81.3 kg of dimethyl terephthalate, 56.5 kg of 1,4-butane diol, and 10.1 kg of dioleic acid. The reaction mixture was heated, with stirring, to 110° C, whereupon 40.6 g of tetrabutyl titanate were added. As the temperature was further increased to 160° C, methanol distilled off, after which the pressure was slowly reduced to 100 Pa and the temperature increased to 245° C. In the course of this polycondensation reaction of 3 to 4 hours, duration a product (f) was obtained having a relative viscosity of 2.06 (measured at a concentration of 1.0 g in 100 g of m-cresol at 25° C). In an analogous manner the polyesters (PE) f5, f30, and f50 were prepared using 5, 30, and 50 wt % of di-oleic acid, respectively, and also polyester f10 was prepared using 10 wt % of di-erucic acid.

Preparation of prepolymers 50 parts of polyester (PE) modified with dimer acid (f) were admixed with 0.5 parts of ingredient (2) (g) together with 0, 0.05, 0.1, and 0.2 parts, respectively, of initiator (h) on a Werner & Pfleiderer vented twin screw extruder of the type ZSK 30 (L/D =38) at a rate of 250 r.p.m. and a set temperature profile of 195-22-5-260-260-260-260-260° C. The resulting granular product was next dried in vacuo for 16 hours at 100° C.

EXAMPLE II

On a Werner & Pfleiderer ZSK 30 vented twin screw extruder the prepolymers of Example I were admixed, at a rate of 250 r.p.m. and a set temperature profile of 250-270-280-290-290-290° C., with equal amounts by weight of PA 6 (b) or PA 6,6 (a), after which the samples were dried in vacuo for 16 hours at 100° C. The resulting granular product was injection molded on a Demag D 60 NC III-275A injection molding machine (tie rods, HDT rods) and an Arburg injection molding machine (=25 mm).

The composition of these blends and the data for the properties measured on them are given in Table 1. Said properties were measured in accordance with the following standards:

|  | Standard |
| --- | --- |
| Yield stress (MPa) | ISO R527 |
| Yield strain (%) | ISO R527 |
| Breaking strength (MPa) | ISO R527 |
| Elongation at break (%) | ISO R527 |
| Flexural modulus (MPa) | ISO 178 |
| Flexural strength (MPa) | ISO 178 |
| Izod ¼", notched (kJ/m$^2$) | ISO 180/4A |
| Izod ¼", unnotched (kJ/m$^2$) | ISO 180/4C |
| Charpy, notched (kJ/m$^2$) | ISO 179/2C |
| HDT (°C.) | ISO 75 |

TABLE 1

50/50 blend of PA/PE containing 0.5 parts of (g)/100 parts of PA + PE (initiator concentration)

| Composition | PA (6b) | Blank | A(0) | B(0.05) | C(0.1) | D(0.2) | PE(f) |
| --- | --- | --- | --- | --- | --- | --- | --- |
| Property |  |  |  |  |  |  |  |
| Yield stress (MPa) | 79.6 | — | — | 56.7 | 58.9 | 59.8 | 41.6 |

TABLE 1-continued

50/50 blend of PA/PE containing 0.5 parts of (g)/100 parts of PA + PE (initiator concentration)

| Composition | PA (6b) | Blank | A(0) | B(0.05) | C(0.1) | D(0.2) | PE(f) |
|---|---|---|---|---|---|---|---|
| Yield strain (%) | 3.9 | — | — | 6.2 | 5.6 | 6.7 | 15.5 |
| Breaking str. (MPa) | 40.3 | 54.5 | 52.7 | 55.5 | 53 | 39.5 | 32.3 |
| Elong. at break (%) | 41.5 | 5 | 3 | 12 | 22 | 50 | 213 |
| Flex. mod. (MPa) | 2414 | 1833 | 1809 | 1852 | 1920 | 1815 | 1207 |
| Flex. str. (MPa) | 95.2 | 69.8 | 64.4 | 66.6 | 70.8 | 67.7 | 40.7 |
| Izod (kJ/m$^2$) | 5 | 3.3 | 2.7 | 3.2 | 5.1 | 7.5 | 2.9 |
| Charpy (kJ/m$^2$) | 5.6 | 3.2 | 2.4 | 2.9 | 5.1 | 5.3 | 2.8 |
| HDT-A (°C.) | 58 | 51 | 49 | 51 | 51 | 52 | 46 |
| HDT-B (°C.) | — | 162 | 159 | 163 | 163 | 160 | 132 |

It is clear from the measuring results listed in the table above that the elongation at break and the impact strength of the present PA/PE blends will increase only when the preparation of the prepolymer involves the use of sufficient initiator for the reaction of the maleic anhydride with the dimer fatty acid present in the PE.

EXAMPLE III

In a manner analogous to that disclosed in Example II 50/50 blends were prepared starting from PA 6 (b) and a number of prepolymers which differed from each other only in the type and amount of initiator used in their preparation. The data for the properties of these blends, measured on test bars, is listed in the table below. The letters E, F, G, and H here represent the blends in question, with the initiator employed and the ratio of the initiator to ingredient (2) (g) being given in parentheses.

TABLE 2

50/50 blend of PA/PE Composition containing 0.5 parts of (g)/100 parts of PA/PE

| | PA 6(b) | Blank | E(k;0.2) | F(i;0.4) | G(j;0.4) | H(l;0.5) | PE(f) |
|---|---|---|---|---|---|---|---|
| Property | | | | | | | |
| Yield stress (MPa) | 79.6 | — | 61.7 | 58 | 57.4 | 58.9 | 41.6 |
| Yield strain (%) | 3.9 | — | 4.7 | 5.2 | 5.3 | 5 | 15.5 |
| Breaking str. (MPa) | 40.3 | 54.5 | 44.1 | 49.3 | 41.6 | 41.1 | 32.3 |
| Elong. at break (%) | 41.5 | 5 | 103 | 12.5 | 13.3 | 17.8 | 213 |
| Flex. mod. (MPa) | 2414 | 1833 | 2109 | 1996 | 1973 | 2068 | 1207 |
| Flex. str. (MPa) | 95.2 | 69.8 | 79.9 | 76.1 | 75.1 | 77.9 | 40.7 |

EXAMPLE IV

In a manner analogous to that disclosed in Example II blends were prepared starting from PA 6 ) (b), PA 6,6 (a) and varying amounts of prepolymer. The prepolymer was obtained by admixing 100 parts of polyester PE modified with dimer acid (f) with 0.2 parts of initiator (h) and 0.5 parts of ingredient (2) (g), in a manner analogous to that disclosed in Example I. The data for the properties of these blends, measured on test bars, is given in the table below.

TABLE 3

| Composition | PE/PA66 | PE/PA6 (with ingr.(2)) | | | PE/PA6 (w/o ingr. (2)) | | |
|---|---|---|---|---|---|---|---|
| Wt. ratio | 50/50 | 75/25 | 50/50 | 25/75 | 75/25 | 50/50 | 25/75 |
| Yield stress (MPa) | 61.9 | 49.4 | 59.6 | 73 | 45.6 | — | 68.9 |
| Yield strain (%) | 9.3 | 11 | 6 | 3.9 | 6.6 | — | 3.9 |
| Breaking str. (MPa) | 60.9 | 33.4 | 41.5 | 53.9 | 44.8 | 54.5 | 38.8 |
| Elong. at break (%) | 12.5 | 77 | 33.6 | 44 | 10.1 | 3.8 | 24.3 |
| Flex. mod. (MPa) | 2092 | 1708 | 2064 | 2487 | 1728 | 2110 | 2356 |
| Flex. str. (MPa) | 81.5 | 62.7 | 78.1 | 96.2 | 61.4 | 79.7 | 93.2 |

The measuring results in the table above clearly show a substantial increase in the elongation at break of the present blends when use is made of a polyester (PE) modified with maleic anhydride.

EXAMPLE V

The present example shows that, alternatively, the modified polyester (f) used may be a polyester modified with some other dimer acid or some other content of dimer acid. The prepolymer used was f5, f30, and f10, with grafted thereon, in the presence of the listed initiators, the amounts of maleic anhydride listed in the tables below. The data for the properties of these blends, measured on test bars, can be found in the two tables below.

TABLE 4

| | Blend | | | | | |
|---|---|---|---|---|---|---|
| | 1 | 2 | 3 | 4 | 5 | 6 |
| Composition | in wt % | | | | | |
| Polyamide 6 (n) | 50 | 50 | 50 | 50 | 50 | 50 |
| Polyester (PE) (f5) | 50 | 48.85 | 46.95 | — | — | — |
| Polyester (PE) (f30) | — | — | — | 50 | 48.85 | 46.95 |
| MA 903 (g) | — | 1.00 | — | — | 1.00 | — |
| MA 911 (t) | — | — | 1.88 | — | — | 1.88 |
| Perkadox BC (h) | — | 0.15 | — | — | 0.15 | — |
| Perkadox 64 (u) | — | — | 1.17 | — | — | 1.17 |
| Property | | | | | | |
| Yield stress (MPa) | — | 71.2 | 68.4 | — | 45.6 | 43.3 |
| Yield strain (%) | — | 3.5 | 3.3 | — | 8.2 | 7.1 |
| Breaking strength (MPa) | — | 48.6 | 43.0 | — | 41.4 | 39.4 |
| Elongation at break (%) | — | 33.6 | 24.6 | — | 16.2 | 18.5 |
| Flexural modulus | — | 3015 | 2920 | — | 1624 | 1547 |

TABLE 4-continued

|  | Blend | | | | | |
|---|---|---|---|---|---|---|
|  | 1 | 2 | 3 | 4 | 5 | 6 |
| (MPa) | | | | | | |

TABLE 5

| | Blend | | | |
|---|---|---|---|---|
| | 7 | 8 | 9 | 10 |
| Composition | in wt % | | | |
| Polyamide 6 (n) | 50 | 50 | 50 | 50 |
| Polyester (PE) (f50) | 50 | 48.85 | 46.95 | — |
| Polyester (PE) (f10) | — | — | — | 48.85 |
| MA 903 (g) | — | 1.00 | — | 1.00 |
| MA 911 (t) | — | — | 1.88 | — |
| Perkadox BC (h) | — | 0.15 | — | 0.15 |
| Perkadox 64 (u) | — | — | 1.17 | — |
| Property | | | | |
| Yield stress (MPa) | 25.8 | 24.5 | 25.2 | 61.0 |
| Yield strain (%) | 7.6 | 31.3 | 28.4 | 5.5 |
| Breaking strength (MPa) | 25.4 | 24.4 | 25.0 | 46.7 |
| Elongation at break (%) | 8.1 | 33.2 | 33.4 | 19.8 |
| Flexural modulus (MPa) | 874.7 | 558.2 | 583.6 | 2262 |

EXAMPLE VI

The present example shows that the presence of a large amount of polyester which is not modified with dimer acid detracts from the effect of increased elongation at break little if at all. The prepolymer used was the same one as in Example IV. The data for the properties of these blends, measured on test bars, can be found in the table below.

TABLE 6

| Composition | PBT/PA6 | PBT/PA6/PE (PE with ingr. (2)) | |
|---|---|---|---|
| Weight ratio | 75/25 | 71.25/23.75/5 | 65.5/22.5/10 |
| Property | | | |
| Yield stress (MPa) | — | 65.4 | 63.3 |
| Yield strain (%) | — | 4.3 | 5.2 |
| Breaking strength (MPa) | 66.9 | 63.5 | 58.1 |
| Elong. at break (%) | 3.3 | 9.7 | 11.1 |
| Flexural modulus (MPa) | 2686 | 2606 | 2560 |
| Flexural strength (MPa) | 96.9 | 93.2 | 92.1 |

EXAMPLE VII

The present example examines how much modified prepolymer has to be present in order for there to be a clear effect still. The prepolymer used was the same one as in Example IV. The data for the properties of these blends, measured on test bars, can be found in the table below.

TABLE 7

| Composition | PBT/PA6 | PBT/PA6/PE (PE with ingr. (2)) | | | |
|---|---|---|---|---|---|
| Wt. ratio | 60/40 | 58.5/39/2.5 | 57/38/5 | 55.5/37/7.5 | 54/36/10 |
| Property | | | | | |
| Yield stress (MPa) | — | — | 70.3 | 68.3 | 66.2 |
| Yield strain (%) | — | — | 4 | 4.2 | 4.5 |
| Breaking str. (MPa) | 67.6 | 70.3 | 69.7 | 65.7 | 62.5 |
| Elong. at break (%) | 2.8 | 4 | 4.9 | 8.4 | 10.6 |
| Flex. mod. (MPa) | 2774 | 2747 | 2741 | 2701 | 2626 |
| Flex. str. (MPa) | 100.4 | 100.1 | 99.4 | 97.7 | 95.2 |

EXAMPLE VIII

In a manner analogous to that disclosed in Example VII it was examined how much of the modified prepolymer is required to be present at a weight ratio of 25 parts of PBT to 75 parts of PA 6. The data for the properties of these blends, measured on test bars, is given in the table below.

TABLE 8

| Composition | PBT/PA6 | PBT/PA6/PE (PE with ingr. (2)) | |
|---|---|---|---|
| Weight ratio | 25/75 | 23.75/71.25/5 | 22.5/67.5/10 |
| Property | | | |
| Yield stress (MPa) | 76 | 73.9 | 75.5 |
| Yield strain (%) | 4 | 3.5 | 3.9 |
| Breaking strength (MPa) | 56 | 48.7 | 49.8 |
| Elongation at break (%) | 10.9 | 55.7 | 46.9 |
| Flexural modulus (MPa) | 2593 | 2621 | 2656 |
| Flexural strength (MPa) | 102.3 | 101 | 101 |

EXAMPLE IX

The example below shows that attaining a favorable result does not require the polyester (PE) modified with dimer fatty acid to be of the same composition as the polyester not modified with dimer fatty acid (3). The prepolymer used was the same one as in Example IV. The polyamide was PA 66 (a) and as the polyester not modified with dimer fatty acid polyethylene terephthalate (PET) (c) was selected. The data for the properties of these blends, measured on test bars, is listed in the table below.

TABLE 9

| Composition | PET/PA66 | PET/PA66/PE (PE with ingr. (2)) | |
|---|---|---|---|
| Weight ratio | 50/50 | 47.4/47.6/5 | 42/48/10 |
| Property | | | |
| Yield stress (MPa) | — | 83.9 | 85 |
| Yield strain (%) | — | 3.7 | 4.2 |
| Breaking strength (MPa) | — | 67.2 | 66.3 |
| Elongation at break (%) | — | 10.1 | 11.8 |
| Flexural modulus (MPa) | — | 2975 | 2822 |
| Flexural strength (MPa) | — | 114.1 | 108.5 |
| Izod (kJ/m$^2$) | — | 136 | 180 |
| Izod, notched (kJ/m$^2$) | — | 3 | 3 |
| Charpy, notched | — | 2.5 | 3 |

TABLE 9-continued

| Composition | PET/PA66 | PET/PA66/PE (PE with ingr. (2)) | |
|---|---|---|---|
| Weight ratio | 50/50 | 47.4/47.6/5 | 42/48/10 |
| (kJ/m²) | | | |
| HDT-A (°C.) | — | 78 | 75 |

Note: the PET/PA66 composition could not be processed into a regular extruded product.

EXAMPLE X

In a manner analogous to that disclosed in Example IX blends were prepared of PET (d) and PA 6 (b) using the same prepolymers as in Example IV. The data for the properties of these blends, measured on test bars, can be found in the table below.

TABLE 10

| Composition | PET/PA6 | PET/PA6/PE (PE with ingr. (2)) | | |
|---|---|---|---|---|
| Wt. ratio | 60/40 | 57/38/5 | 54/36/10 | 47.4/47.6/5 |
| Property | | | | |
| Yield stress (MPa) | — | 74.3 | 79.2 | 86.7 |
| Yield strain (%) | — | 2.9 | 3.9 | 4 |
| Breaking strength (MPa) | — | 72.2 | 43.2 | 55.2 |
| Elongation at break (%) | — | 4.1 | 16.6 | 8.2 |
| Flexural modulus (MPa) | — | 2964 | 2826 | 3048 |
| Flexural strength (MPa) | — | 112 | 106.9 | 112.3 |
| Izod (kJ/m²) | — | 58 | 67 | 100 |
| Izod, notched (kJ/m²) | — | 1.5 | 1.7 | 2.4 |
| Charpy, notched (kJ/m²) | — | 2.1 | 1.9 | 2.2 |
| HDT-A (°C.) | — | 75 | 67 | 73 |

Note: the PET/PA6 composition could not be processed into a regular extruded product.

EXAMPLE XI

The example below shows that for ingredient (3) a polycarbonate may be selected as well as a polyalkylene terephthalate. The prepolymer used was Mod-U74D (f), on which 2% of maleic anhydride was grafted in the presence of 0.2 wt % of P/BC (h). The polyamide was PA 6 (n), and the polycarbonate (PC) selected was Makrolon 2400 (p) ex Bayer. Further, in the presence of ingredient (2) use was always made of processing means KN 35 (q), which is composed of a blend of EPDM-rubber and an ethylene-propylene copolymer with maleic anhydride grafted thereon. The data for the properties of these blends, measured on test bars, is compiled in the table below.

TABLE 11

| | Blend Composition in wt % | | | | | |
|---|---|---|---|---|---|---|
| | 1 | 2 | 3 | 4 | 5 | 6 |
| Polycarbonate (PC) | 61.2 | 57 | 49.2 | 38 | 35 | 29.9 |
| Polyamide 6 (n) | 38.8 | 34.4 | 31.2 | 61.2 | 52 | 47 |
| KN 35 (q) | — | 8.6 | 5.4 | — | 13 | 9.5 |
| Mod-U74D (r) | — | — | 14.2 | — | — | 13.6 |
| Property | | | | | | |
| Yield stress (MPa) | — | — | 63.2 | — | — | 58.2 |
| Yield strain (%) | — | — | 3.6 | — | — | 3.8 |
| Breaking strength (MPa) | 60.6 | 40.9 | 31.7 | 62.6 | 39.9 | 41.2 |
| Elongation at break (%) | 2.7 | 2.1 | 10.0 | 2.4 | 2.1 | 27.2 |
| Flexural modulus (MPa) | 2613 | 2168 | 2424 | 2726 | 2291 | 2237 |
| Flexural strength (MPa) | 104 | 76 | 95 | 103 | 68.3 | 86.9 |
| Izod ⅛", notched (kJ/m²) | 21 | 17 | 45 | 18 | 13 | 26 |

The measuring results in the table above clearly show a substantial increase in the elongation at break of the present blends when use is made of a polyester modified with maleic anhydride (r).

EXAMPLE XII

The example below shows that ingredient (3) may also be a polyarylate. The prepolymer used was Mod-U74D (f), on which 2% of maleic anhydride was grafted in the presence of 0.2 wt % of P/BC (h). The polyamide was PA 6 (n) or PA 66 (m), and the polyarylate used was Ardel D-100 (o) ex Amoco. Further, in the presence of ingredient (2) use was made in several cases of processing means, e.g. KN 35 (q), Arnitel A 52D (s) and/or Arnitel U 74D (f) ex Akzo Plastics. The data for the properties of these blends, measured on test bars, can be found in the table below.

TABLE 12

| | Blend in wt % | | | | | |
|---|---|---|---|---|---|---|
| Composition | 1 | 2 | 3 | 4 | 5 | 6 |
| Polyarylate (PAR) | 50 | 45 | 35 | 35 | 40 | 40 |
| Polyamide 6 (n) | — | — | — | 33.6 | 45 | 45 |
| Polyamide 66 (m) | 50 | 45 | 42 | — | — | — |
| Mod-U 74D (r) | — | — | 23 | 23 | — | 5 |
| KN 35 (q) | — | 10 | — | 8.4 | — | — |
| Arnitel A 52D | — | — | — | — | 5 | 5 |
| Arnitel U 74D (f) | — | — | — | — | 10 | 5 |
| Property | | | | | | |
| Yield stress (MPa) | — | 54.2 | 79 | 62.9 | — | 77.8 |
| Yield strain (%) | — | 8.1 | 3.9 | 4.2 | — | 5.3 |
| Breaking strength (MPa) | 54.1 | 52.8 | 50.7 | 48.2 | 73.8 | 65.6 |
| Elongation at break (%) | 2.3 | 17.9 | 19.3 | 25.5 | 4.9 | 15.4 |
| Flexural modulus (MPa) | 2440 | 1950 | 2822 | 2316 | 2550 | 2670 |
| Izod ⅛", notched (kJ/m²) | 1.8 | 3.2 | 4.3 | 11.4 | 3.4 | 4.0 |

The measuring results in the table above clearly show that there is a substantial increase in the elongation at break of the present blends when use is made of a polyester modified with maleic anhydride (r).

EXAMPLE XIII

The example below shows that ingredient (1) may also be polyamide-4,6 (W). The prepolymer used was Mod-U74D (f), on which 2% of maleic anhydride was grafted in the presence of 0.2 wt % of P/BC (h). The polyester was PETP (v) and the glass fibers were obtained from Silenka (Silenka 8045). The data for the properties of these blends, measured on test bars, can be found in the table below.

TABLE 13

| Composition Weight ratio | PET/PA46 40/60 | PET/PA46/PE/ (×) (PE with ingr. (2)) | |
|---|---|---|---|
| | | 36/54/10 | 25/38/7/30 |
| Property | | | |
| Breaking strength (MPa) | — | 80 | 165 |
| Elongation at break (%) | — | 3.2 | 2 |
| Flexural modulus (MPa) | — | 3000 | 9000 |
| Flexural strength (MPa) | — | 95 | 210 |
| Izod, notched (kJ/m$^2$) | — | 2 | 8 |

Note: the PET/PA46 composition could not be processed into a regular extruded product.

EXAMPLE XIV (comparative example)

This example shows that using the process according to Japanese Patent Specification J60137 961-A, in which a polyester modified with dimer fatty acid is not employed, results in a product which cannot be extruded into regular filaments and also has other inferior processing properties. On a Werner & Pfleiderer vented twin-screw extruder of the type ZSK 30 (L/D =38) 93 parts of polyethylene terephthalate (c) were admixed, at a rate of 250 r.p.m. and a set temperature profile of 270° C, with 2.3 parts of di-isopropyl benzene peroxide as initiator (h) and 4.7 parts of a maleic anhydride concentrate (g). Next, in the same extruder polyamide-66 (m) in an amount by weight equivalent to the polyethylene terephthalate was added and the resulting blend extruded. The extruded product obtained was found to be completely irregular, so that it proved impossible to chop it into granules of regular dimensions.

We claim:

1. A plastics composition comprising:
(1) 100 parts by weight of a thermoplastics blend of
   (a) a polyamide (PA) and
   (b) a polyester (PE)
   (a) and (b) being present in a ratio of between 5/95 and 95/5;
(2) 0.01-30 parts by weight of a compound having at least one ethylenically unsaturated group or propylene group and further having a carboxylic, acid anhydride, acid amide, imido, carboxylic ester, amino or hydroxyl group; and
(3) 0-90 parts by weight of a polyester not modified with dimer fatty acid wherein the polyester (b) contains 1-50% based on the polyester of an aliphatic dimer fatty acid.

2. A plastics composition of claim I wherein the amounts by weight of PA and PE are in a ratio to each other of 1/9 to 9/1.

3. A plastics composition of claim I wherein the polyester (PE) is an aromatic polyester derived from an aromatic dicarboxylic acid, dimer fatty acid, and a low molecular weight diol having a molecular weight of not higher than 250.

4. A plastics composition of claim 1 wherein the dimer fatty acid has 30-46 carbon atoms.

5. A plastics composition of claim 1 wherein the polyester (PE) is selected from the group consisting of polyethylene terephthalate and polybutylene terephthalate modified with dimer fatty acid.

6. A plastics composition of claim 1 wherein the dimer fatty acid is di-oleic acid.

7. A plastics composition of claim 1 wherein compound (2) is selected from the group consisting of maleic anhydride, maleic acid, fumaric acid, maleic imide, maleic hydrazide, methyl nadic anhydride, dichloromaleic anhydride, maleic acid diamide, natural fats, natural oils, unsaturated carboxylic esters, acid amides, anhydrides of unsaturated carboxylic acids, unsaturated alcohols, unsaturated amines, reaction products of diamine and maleic anhydride, reaction products of diamine and maleic acid, reaction products of diamine and fumaric acid, reaction products of diamine and maleic imide, reaction products of diamine and maleic hydrazide, adducts of diene polymer to maleic anhydride, adducts of ethylenepropylene copolymer to maleic anhydride, diene polymers substituted with at least one amino, carboxyl, acid anhydride or hydroxyl group and ethylene-propylene copolymers substituted with at least one amino, carboxyl, acid anhydride or hydroxyl group.

8. A plastics composition of claim 1 wherein the polyester not modified with dimer fatty acid is a polyarylate or a polycarbonate.

9. A plastics composition of claim 1 wherein the polyester not modified with dimer fatty acid is polyethylene terephthalate or polybutylene terephthalate.

10. A process for the preparation of a plastics composition of claim 1 said process comprising (a) converting the polyester (PE) with a compound (2) in the presence of a radical initiator, and (b) melt converting the product of step (a) with a polyamide (PA).

11. A process of claim 10 further comprising carrying out melt converting step (b) with the additional presence of a polyester not modified with dimer fatty acid.

* * * * *